United States Patent [19]
Titcombe

[11] 3,868,083
[45] Feb. 25, 1975

[54] TRAILER BED
[75] Inventor: Alan Titcombe, Broomfield, Colo.
[73] Assignee: Irvin Industries, Inc., Greenwich, Conn.
[22] Filed: Oct. 26, 1973
[21] Appl. No.: 410,022

[52] U.S. Cl. .......................................... 105/366 B
[51] Int. Cl. ............................................ B65j 1/22
[58] Field of Search .................. 248/119 R, 361 R; 280/179 R; 105/366 E

[56] References Cited
UNITED STATES PATENTS

| | | | |
|---|---|---|---|
| 2,424,429 | 7/1947 | Bamberg | 248/361 R UX |
| 3,210,038 | 10/1965 | Bader et al. | 248/361 R |
| 3,399,921 | 9/1968 | Trost et al. | 248/361 R X |
| 3,498,238 | 3/1970 | Sweger | 248/361 R X |

Primary Examiner—Willaim H. Schultz
Attorney, Agent, or Firm—Ryder, McAulay, Fields, Fisher & Goldstein

[57] ABSTRACT

A trailer bed having paired retractable fasteners to hold the rim of a container placed thereon from rolling off or bouncing off while the trailer is pulled across a field. A fastener includes a shoulder element which is rotatably mounted to the bed and can be retracted to a position below the surface of the bed by use of a pull rod. The shoulder element abuts against the edge of the container lip to prevent longitudinal movement of the container from the bed. A tongue element is rotatably mounted to the shoulder element and includes a latching tongue that extends out through an opening in the shoulder. When the shoulder element is rotated to a retracted position, the tongue element pivots within the shoulder element and also retracts to below the container bed so that the container itself can be rolled on or off the bed. When protracted, the tongue element extends out an opening in the shoulder and over the lip of the container to hold the container from bouncing up off the bed.

4 Claims, 6 Drawing Figures

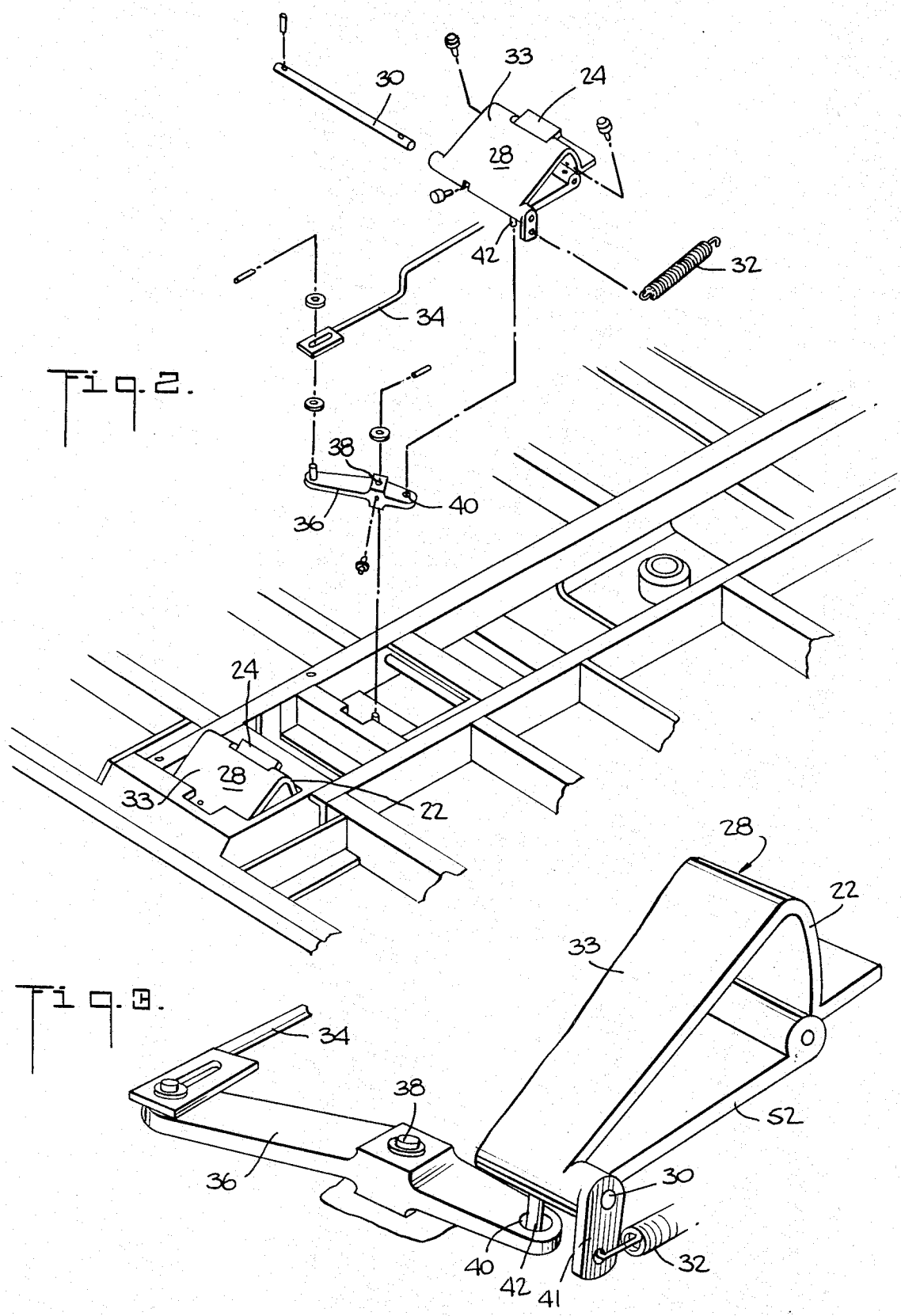

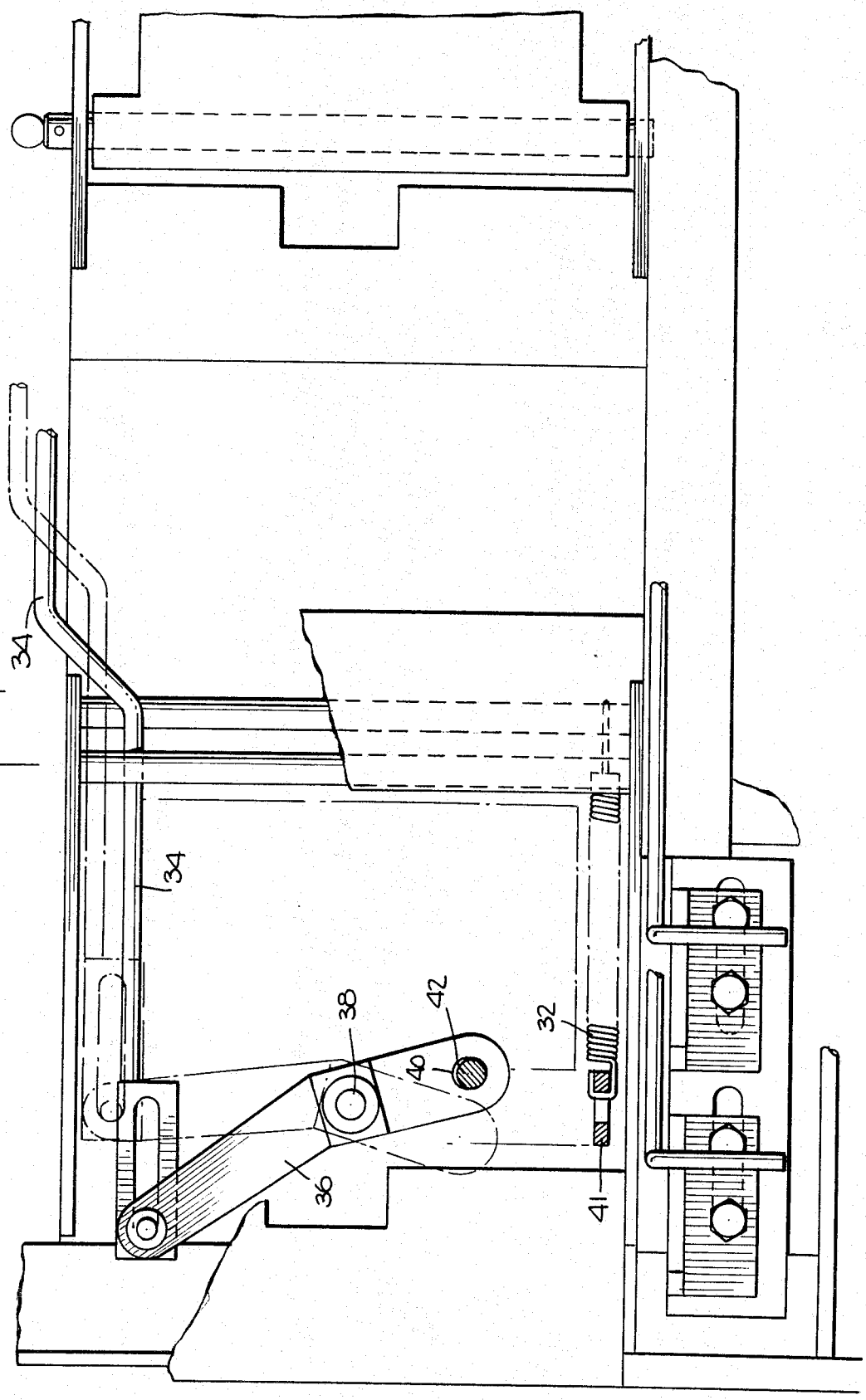

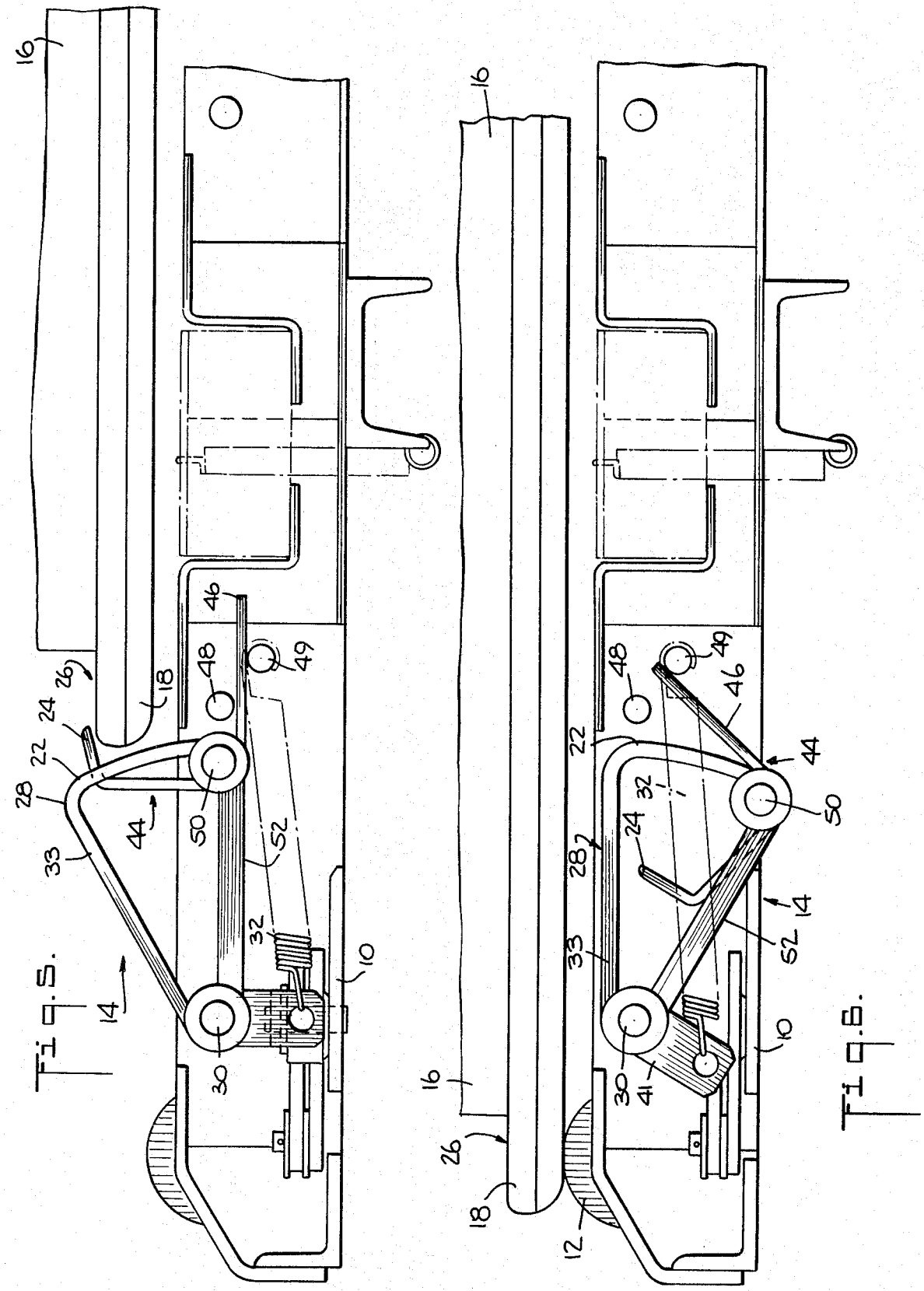

3,868,083

TRAILER BED

BACKGROUND OF THE INVENTION

This invention relates to the kind of container holding beds which are mounted on chassis and which in combination with the chassis constitute a trailer that can be drawn by the motorized vehicle. The bed itself is normally a separate unit that is affixed to a chassis having wheels and a tow mechanism for hooking to other chassis or to other motorized vehicles. Typically, the bed has a series of rollers over which a container carrying carrying merchandise or baggage can be rolled in a longitudinal direction. The rollers aid in moving the container across the bed until the container is properly positioned.

Simply and quickly and securely fastening the container to the bed for the trip is a matter of major importance. Particularly where the trip is of relatively short duration, as where a container carries baggage from an aircraft at a landing field to a baggage claim area, it is important that the time it takes to fasten and unfasten the container be minimal.

Accordingly, it is the major purpose of this invention to provide a simple to operate container securing mechanism for holding the container to the bed of a trailer.

It is also important that the holding mechanism hold the container against longitudinal movement in the direction of rotation of the rollers and further hold the container against vertical bouncing movement from the rollers. Thus it is a further purpose of this invention to provide a holding mechanism which will prevent both longitudinal and vertical movement of the container while the container is being pulled across the field.

It is also of importance that the achievement of simplicity and security be in a design that is rugged in order to prevent excessive down time, and inexpensive so that the design can be used in a wide range of facilities. Such goals are further objects to this invention.

BRIEF DESCRIPTION OF THE INVENTION

In brief, this invention is in a fastening mechanism having a shoulder and a tongue. The shoulder abuts against the ledge-like lip of a container and prevents the container from rolling off the bed. The tongue projects over the ledge-like lip and thus holds the container from bouncing on the bed. The tongue projects outwardly from an opening in the shoulder. The shoulder element is pivotally mounted so that a lever can be manually pulled to cause the shoulder to pivot down into the bed and thus permit a container to be rolled onto the bed over the shoulder. The tongue element is pivotally mounted to the shoulder element and is further positioned by two bars mounted to the bed on either side of a leg of the tongue. When the shoulder pivots down, the tongue slides between the two bars and also pivots down out of the way together with the shoulder.

BRIEF DESCRIPTION OF THE DRAWINGS

FIG. 2 is an exploded view of the elements constituting the stop of this invention.

FIG. 3 is a perspective view showing the relationship between the stop shoulder, a lever and the pull mechanism which permits pivoting of the shoulder out of the way so that a container can be slid across the bed.

FIG. 4 is a top view of the mechanism of this invention showing the lever and pull mechanism using solid lines to show the normal state of the lever pull and dash-dot lines to show the retracted state of the lever and pull.

FIG. 5 is an elevated view showing the shoulder and hold down tongue mechanism in the normal protracted state; corresponding to the solid line position of the pull and lever in FIG. 4.

FIG. 6 is a view similar to FIG. 5 showing the shoulder and hold down tongue mechanism in the retracted state, corresponding to the dash-dot position of the pull and lever in FIG. 4.

DESCRIPTION OF THE PREFERRED EMBODIMENTS

Figure 1:
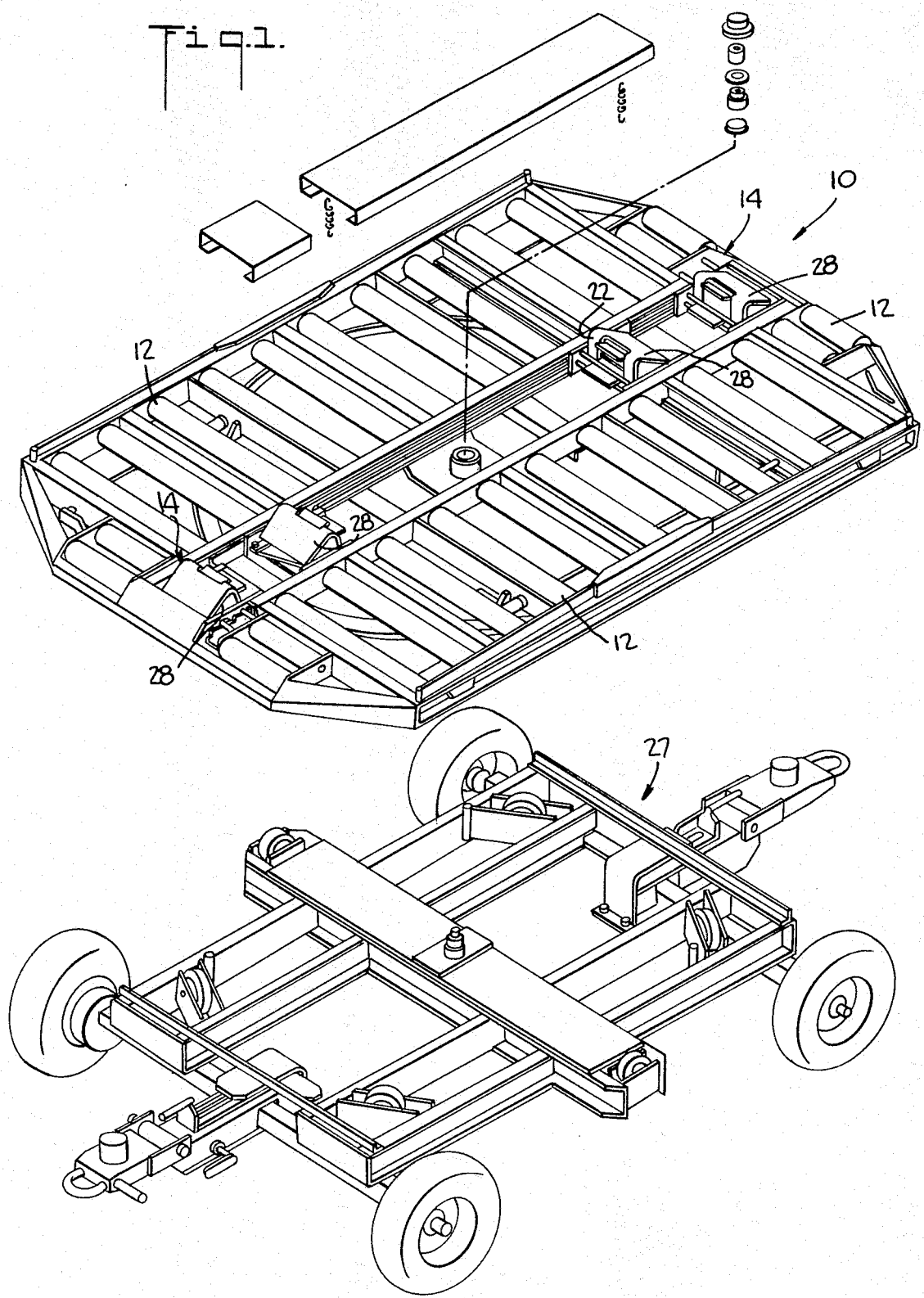
FIG. 1 is an exploded view showing the relationship between the bed incorporating this invention and the chassis to which the bed is attached.

With reference to the FIGS., all of which show the same embodiment, a trailer bed 10 has a series of 2-inch rollers 12 which permit a full and thus heavy container to be slid or rolled onto the bed 10 in a longitudinal direction. Along the center strip of the bed there are four fastening devices 14. Each fastener 14 has substantially the same construction. These fasteners 14 operate in pairs. An inner pair functions to fasten down a smaller size container while the outer pair functions to fasten down a larger size container. The description of the structure and function of any one of these fasteners 14 will make clear the operation of this invention.

A container 16 (see FIGS. 5 and 6) having an outwardly extending flange-like lip 18 along the base rim of the container 16 will fit between two of these fasteners 14. The outer edge of the lip 18 will abut against the shoulder 22 of the fastener 14 and thus two of these fasteners 14 will hold the container 16 from longitudinal movement on the bed 10. In addition, a tongue 24 extending out from an opening in the shoulder 22 closely overlies the top surface 26 of the lip 18 to prevent the container 16 from bouncing up from the bed 10 as the chassis 27 to which the bed 10 is attached is pulled over rough terrain. Thus the container 16 is kept from rolling off the bed 10 and from bouncing up on the bed 10 in response to the jogging or bumping in the field over which the chassis 27 is drawn.

The shoulder 22 is formed as one of the surfaces of a triangular shaped element 28. This shoulder element 28 is mounted for pivotal movement, relative to the bed 10, about an axis 30 and is spring 32 loaded into a normal upward position as shown in FIG. 5. When a container 16 is rolled across the bed 10, the container 60 hits the outwardly facing sloping surface 33 of the shoulder element 28 of the first two fasteners 14 causing the fasteners 14 to pivot down, about the axis 30, into the bed 10 to permit the container to pass over. If, for example, a large size container is employed, then the third fastener 14 with its shoulder 22 facing the container lip 18, must be rotated out of the way to permit the container to pass over. This is done by means of a manually operated pull rod 34. The pull rod 34 extends longitudinally (see FIG. 4) and when manually pulled longitudinally causes lever 36 to rotate about an axis 38 (as may best be seen in FIG. 3). The lever 36, through an opening 40, engages a pin 42 that is connected to and extends down from the triangular element 28. The pin 42 extends vertically down below the horizontal pivotal axis 30 of the triangular element 28.

When the lever 36 rotates it will move in a horizontal plane and thus apply a horizontal force to the pin 42 tending to cause the pin 42 and the rest of the triangular element 28 to rotate about the horizontal axis 30. As shown, the opening 40 in the lever 36 has a diameter larger than the diameter of the pin 42 so that as the lever 36 moves in a horizontal plane and the pin 42 rotates in a vertical plane about the axis 30 the pin 42 can adjust its position and angle within the hole 40 as required.

The pin 42 is positioned asymmetrically to a longitudinal bisecting plane as a matter of convenience so that there will be as large a mechanical advantage as possible to the lever 36.

The horizontal force exerted on the pin 42 by the lever 36 in response to the pulling of the pull pin 42 by the lever 36 in response to the pulling of the pull rod 44 is in a direction opposed to the horizontal force exerted by the spring 32, through the lug 41, on to the shoulder element 28. Furthermore, both of these forces are exerted in a plane below the pivot line 30. Thus the force on the pin 42 tends to overcome the force on the lug 41 and causes rotation of the shoulder element 28 down from the protracted position of FIG. 5 to the retracted position of FIG. 6.

The tongue 24 is the shorter leg of a hook-shaped element 44. The longer leg 46 of this hook shaped tongue element 44. The longer leg 46 of this hook shaped tongue element 44 is positioned between two pins 48, 49 both of which are mounted to the bed 10. This tongue element 44 is pivotally mounted to the shoulder element 28 for rotation about the axis 50. The tongue portion 24 is partially within the shoulder element 28 and, when protracted, extends through an opening in the shoulder surface 22.

The pins 48 and 49 operate as the stop mechanism for determining the protracted end position for the shoulder element 28. Taking the views shown in FIGS. 5 and 6, the spring 32 tends to rotate the shoulder element 28 in a counterclockwise direction about the axis 30. When in the retracted postion, the longer leg 46 of the tongue element 44 bears against the pin 49. When the associated pull rod 34 is released, the spring 32 causes the shoulder element 28 to rotate counterclockwise and carry with it the tongue element 44. When this occurs, the leg 46 abuts against the pin 48 causing the tongue element 44 to rotate in a clockwise direction relative to the axis 50 while at the same time the tongue element 44 is being carried up relative to the bed 10 by the counterclockwise rotation of the shoulder element 28. The clockwise rotation of the tongue element 44 relative to the axis 50 is stopped at the point shown in FIG. 5 where the leg 46 can no longer slide between the two pins, 48, 49. Since the tongue element 44 can, at that point, no longer adjust itself by rotating in a clockwise direction, this tongue element 44 holds the shoulder element 28 from further counterclockwise rotation and the end position shown in FIG. 5 is attained.

Four fasteners 14 are shown. The inner two function to hold a smaller container and the ourter two to hold a larger container. There is a pull rod 34 associated with each fastener 14 so that a container can be rolled on or off the bed 10 in either direction. FIG. 4 illustrates the position for pull rod 34 in both the normal position (solid lines) where the fastener is protracted and in the activated (phantom) position where the fastener is retracted.

Further counterclockwise rotation of the element 28 from the retracted position shown in FIG. 6 is prevented because the lower surface 52 of the shoulder element 28 abuts against a frame element of the bed 10.

What is claimed is:

1. On the bed of a baggage cart, the container stop and hold down mechanism improvement comprising:

a first element rotatably mounted on said bed and having a first end position extending above the surface of said bed and a second end position entirely below the surface of said bed, a spring connected between said element and said bed to bias said element into said first end position, said first element having a shoulder extending up from said bed in a substantially vertical direction when said element is in said first end position, a second element rotatably mounted on said first element and having a first end position extending above the surface of said bed and a second end position entirely below the surface of said bed, said second element including a tongue portion positioned to extend over the lip of a container abutting against said shoulder when said first element and said second element are both in their said first end positions, constraint means engaging said second element to force said second element into its said first end position when said first element is in its said first end position and to force said second element into its said second end position when said second element is in its said second position.

2. The improvement of claim 1 wherein:

said second element has a leg portion connected to said tongue portion, said constraint means comprises first and second pins mounted to said bed, said leg portion of said second element positioned between said pins, said second element being rotatably mounted to said first element along a line between said leg portion and said tongue portion, the pivot line of said second element on said first element being offset from the pivot line of said first element on said bed, rotation of said first element causing rotation of second element relative to said first element due to the constraint imposed by said pins on said leg portion, said leg portion being free to slide between said pins, the length of said leg portion being sufficient to retain said leg portion between said pins when said second element is in said first end position and when second element is in said second position, 3. The improvement of claim 1 wherein:

the axis of rotation of said first element relative to said bed and the axis of rotation of said second element relative to said first element being horizontal and parallel to one another, and said first and second pins, each being parallel to said axes of rotation.

4. The improvement of claim 2 wherein:

the axis of rotation of said first element relative to said bed and the axis of rotation of said second element relative to said first element being horizontal and parallel to one another, and said first and second pins, each being parallel to said axes of rotation.

* * * * *